US011843229B2

(12) United States Patent
Seekell

(10) Patent No.: US 11,843,229 B2
(45) Date of Patent: Dec. 12, 2023

(54) LINE LIFTER

(71) Applicant: Robert Seekell, Kuna,, ID (US)

(72) Inventor: Robert Seekell, Kuna,, ID (US)

( * ) Notice: Subject to any disclaimer, the term of this patent is extended or adjusted under 35 U.S.C. 154(b) by 128 days.

(21) Appl. No.: 17/655,752

(22) Filed: Mar. 21, 2022

(65) Prior Publication Data

US 2023/0163578 A1 May 25, 2023

Related U.S. Application Data

(60) Provisional application No. 63/283,290, filed on Nov. 25, 2021.

(51) Int. Cl.
*H02G 1/02* (2006.01)
*H02G 7/20* (2006.01)
*F16M 11/24* (2006.01)
*F16M 11/26* (2006.01)

(52) U.S. Cl.
CPC .............. *H02G 1/02* (2013.01); *F16M 11/24* (2013.01); *F16M 11/26* (2013.01); *F16M 2200/066* (2013.01); *H02G 7/20* (2013.01)

(58) Field of Classification Search
CPC .... F16M 11/22; F16M 11/24; F16M 2200/08; B66F 7/00; E04C 3/30; E02D 27/00; E02D 27/43
See application file for complete search history.

(56) References Cited

U.S. PATENT DOCUMENTS

| 1,394,020 | A | * | 10/1921 | Johnson, Jr. | ............ | H02G 1/02 |
| | | | | | | 294/174 |
| 1,793,733 | A | | 2/1931 | Bodendieck | | |
| 2,662,730 | A | | 10/1950 | Crawford | | |
| 3,710,640 | A | | 1/1973 | Stanger et al. | | |
| 3,890,989 | A | * | 6/1975 | Kuxhouse | ............ | A45B 25/02 |
| | | | | | | 135/96 |

(Continued)

FOREIGN PATENT DOCUMENTS

| CN | 106058731 | A | * | 10/2016 | | |
| JP | 3179391 | U | * | 11/2012 | ............ | F16M 11/18 |
| KR | 101593000 | B1 | * | 2/2016 | | |

OTHER PUBLICATIONS

Powerlineman Magazine Fall 2021 vol. 19 Issue 4 pp. 21-23.
(Continued)

*Primary Examiner* — Tan Le
(74) *Attorney, Agent, or Firm* — Scott Swanson; Shaver & Swanson, LLP

(57) ABSTRACT

A portable cross arm support device for temporarily supporting electrical conductors of a power transmission or distribution system. The portable cross arm support is configured for vertical lifting of the conductors. The portable cross arm is configured to fold for facilitating transportation. The portable cross arm has a main support pole mounted in a lifting bracket. Embodiments of the portable cross arm utilize a worm gear lifting system for vertical lifting of the conductors. The cross arm has two opposing horizontal line arms configured to support the electrical conductors. The opposing horizontal line arms extend from a T-connector. The T connector allows the horizontal line arms to pivot to a vertical orientation to provide for folding of the portable cross arm.

16 Claims, 8 Drawing Sheets

(56) References Cited

U.S. PATENT DOCUMENTS

| | | | | |
|---|---|---|---|---|
| 4,466,506 | A * | 8/1984 | Dolenti | H02G 1/02 |
| | | | | 254/133 R |
| 6,766,995 | B1 * | 7/2004 | Hsieh | F16M 11/046 |
| | | | | 248/404 |
| 8,714,525 | B2 | 5/2014 | Lessard | |
| 11,749,978 | B1 * | 9/2023 | Lindquist | H02G 1/04 |
| | | | | 294/174 |
| 2019/0316728 | A1 * | 10/2019 | Chance | F16M 11/10 |

OTHER PUBLICATIONS

Conductor Support Equipment 2200 Chance, Hubbell Literature pp. 2203,2210,2202 pp. 6-8, 11 on PDF Nov. 30, 2021.
Honeywell—Temporary Side Arms and Transfer Arms pp. 1-2 of PDF.
Line Star Utility Supply, Inc. Three-Phase Boom Lifts pp. 9-10 of PDF.
Hastings—A worldwide supplier of Hot Line Tools and Equipment p. 719.
Line Wise TLL-300 p. 4-5 of PDF.
Salisbury by Honeywell p. 1 of PDF.
Movex Innovation—Introducing the new remote line lifter p. 1 of PDF.

* cited by examiner

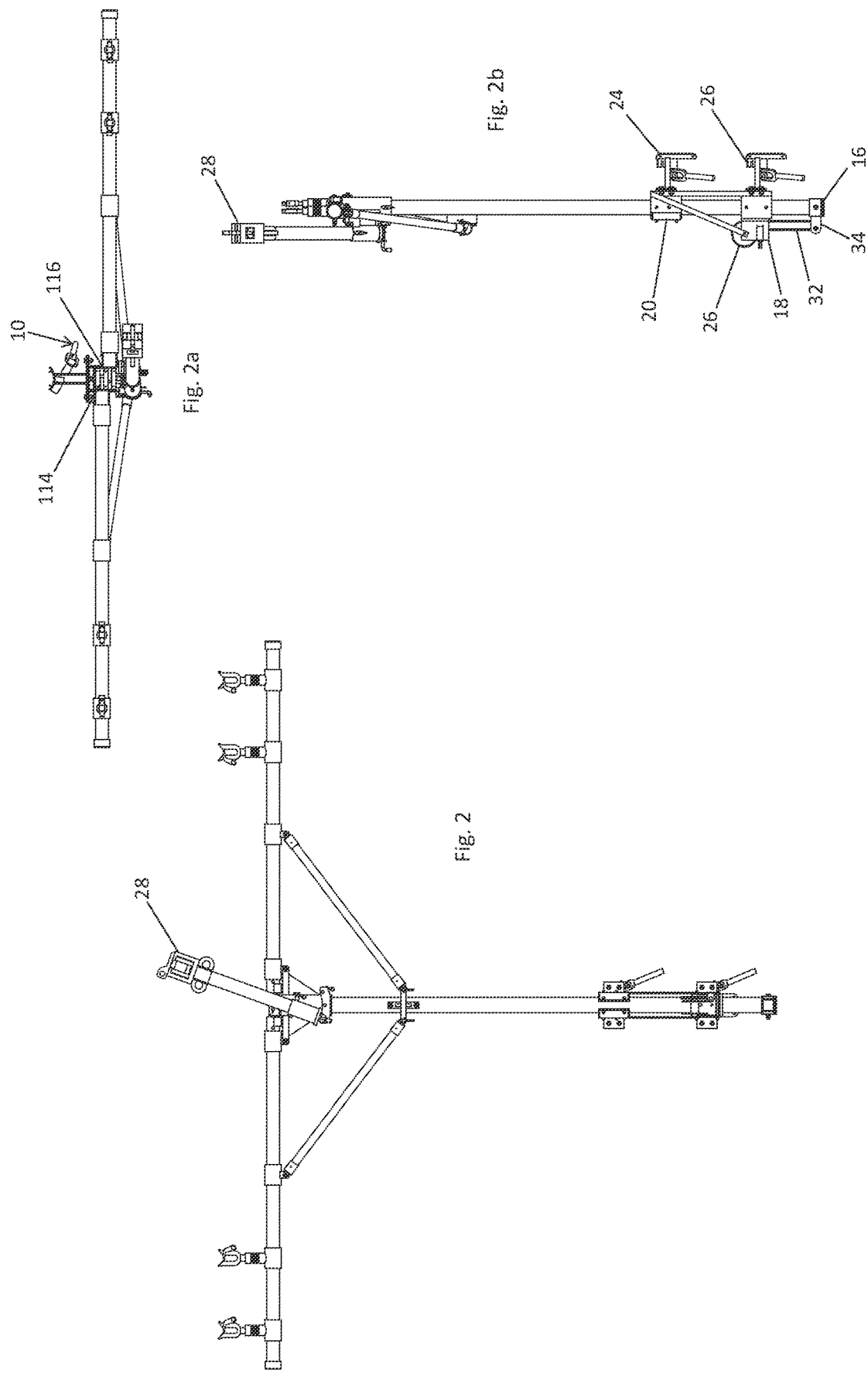

LINE LIFTER

PRIORITY CLAIM

This application claims the benefit of U.S. Provisional Application No. 63/282,390, filed Nov. 25, 2021 the disclosure of which is incorporated by reference.

TECHNICAL FIELD

The presented disclosed technology relates to the field of electrical Power Distribution. More particularly it relates to lifting or holding energized conductors off a utility crossarm for power line workers.

BACKGROUND

Electrical Power Distribution lines extend in networks throughout the United States. The typical voltage of a distribution circuit is anywhere from 4K V to 35 KV. Sub transmission lines carry voltage reduced from the major transmission line system typically 34.5 KV to 69 KV this power is sent to regional distribution substations. The distribution voltage leaves the distribution substations and travels on energized aluminum or copper conductors normally three or four per circuit on a utility cross arm.

When the line workers need to replace a broken crossarm insulator that holds the conductor or do any work at the top of the pole sometimes the conductors on the utility arm need to be lifted and held out of the way. The insulators that hold the conductors on the utility crossarms keeps the current flow isolated from the cross arm to prevent fires or arc flashes. When a utility company has a broken insulator or a broken cross arm that needs to be replaced the line workers typically must remove the energized conductors off the insulators or cross arm. Sometimes lifting all of the energized conductors at the same time is needed to make a safe workplace to change out the utility cross arm or other tasks. The power company is typically trying to keep the conductors energized to continue electricity reaching customers supplied by the conductors that needs to be lifted. There have been many cases around the United States where the line workers are working too close to an energized conductor and accidentally contacts the energized conductor causing an arc flash which can be harmful or fatal. According to OSHA Simply put an arc flash is a phenomenon where a flashover of electric current leaves its intended path and travels through the air from one conductor to another or to ground. This incident has killed and burnt many line workers in the utility industry and it's still happening to this day.

Further, the typical line lifters that are used in the trade today when mounted top a pole require the use of rope blocks and rigging to lift conductors. This task of using ropes is very time consuming with a large number of parts that need to be mounted on pole.

The line lifters of today are also designed to mount to a utility truck or a boom of a bucket truck to pick all conductors up at the same time. If the utility company has a power pole that is not truck accessible, the power company often cannot get a truck mounted line lifter of current design to the power pole. The truck mounted line lifter of today require the use of more motorized equipment that also puts more of a cost burden on a project. When the utility companies cannot pick all energize phases at the same time sometimes the energized conductors need to be deenergized turning off the power to sometimes thousands of customers. The typical line holder that mounts to a power pole today does not give the worker any mechanical advantage beyond using ropes and blocks.

In light of the foregoing, there is a need for an improved line lifter that safely allows the energized conductors to be lifted off the utility cross arm for the line workers. There is a need for a new line lifter that attaches to the power pole easily that can be broken down into sections that can be utilized with a mechanical advantage of a crank or a battery-operated impact wrench. The need for a new design for ergonomics for safety efficiency and that can be used for many different voltages of conductors. With more and more energized work and the utilitys not wanting to de energize the conductors, line workers need a tool to help them lift the energized conductors off the utility cross-arm safely. A line holder that the line worker can adjust to different conductor separation measurements too easily help with their energized work. What further is needed is a line lifter that gives the line worker up to 6 ft of lift for safety and improves workers clearance from the energized conductors. Preferably the line lifter will have a lightweight ergonomic design that can be broken down in different sections and the non-conductive arms can be changed out four different conductor weights or needs.

SUMMARY

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined herein.

A line lifter and line lifting bracket is disclosed. The head of the line lifter that attaches to the pole is preferably aluminum, but can be steel. Two shafts extend horizontally outward from a center shaft or pole. These shafts, or line holders, are nonconductive hot arms preferably of fiberglass construction. On the shaft are wire holders or insulators that can be of typical construction in the industry. These can include top mount or bottom mount holders or insulators. Each hot arm tube will have an aluminum insert at one end that pins to the top of the shaft of the line holder support body that holds tubes at a horizontal position. The vertical shaft of the line holder is a nonconductive 3 inch or 4-inch preferably square tube that can typically be anywhere from 5 to 10 feet long. The preferred construction of this tube is fiberglass. On the top of the vertical nonconductive shaft there is an T-shaped head or connector that is designed to pivot each arm to the left and right that pins the arms with 1 or 2, ½ pins in the horizontal position.

The preferably aluminum head has a removable center holder in some embodiments so a line worker can install a center wire holder in the vertical position. The center wire (or center line) holder has a non-conductive shaft from typically 1.5 inch to 4 inches in diameter for lifting the center conductor on the power pole. The vertical nonconductive shaft can be round or square and be from 2,3, or 4 ft in length. The vertical tube can pin to three different positions left, right or straight up inline with main body support shaft. The center line holder mount can also be unpinned so when there is no center phase the SLL can be lighter. The center line holder generally has an arcuate shape with an internal circumference and an external circumference. The arcuate shape is positioned with the external circumference facing down. A channel is preferably positioned on the upward, internal circumference of the center line holder to allow for a flange at a lower end of the center line holder to slide in the channel for altering alignment of the centerline holder. The second, or upper end of the center line holder is configured to support a center conductor of a power distribution pole to allow the center line to be lifted along with the remaining conductor lines. An example of a configuration to support a center conductor, or other conductor, would be to include an insulator.

Also disclosed is a lifting bracket for lifting the line support body. This lifting body is disclosed with two different mechanisms for attaching to a utility pole, although alternate mechanisms can be used and be within the scope of the patent. One attachment mechanism is configured to use the inventor ratchet system, disclosed for example in U.S. Pat. No. 10,998,700, to be attached. A second attachment mechanism is a chain binder that goes around the power pole to the other side of the base so the line worker can tighten with an aluminum handle.

The nonconductive shaft of the line support body is inserted into the lifting bracket that is attached to the power pole. A lifting mechanism is provided, preferably a worm gear hoist that is operated with a handle or an impact wrench, or handle operated hoist. A worm gear hoist is preferable as it does not require a brake to hold weight. Once the load is lifted it stays where the worker stops. The worm gear hoist preferably has an attached nut so that the worker can use an impact wrench to lift or lower the load. The worm gear hoist has a web strap that extends to the bottom of the shaft of the line support body. This strap preferably passes through a bracket attached to the bottom of the shaft of the line support body and returns to the hoist, although an alternate bracket and strap lifting arrangement can be utilized. Extending and retracting the strap from the hoist causes vertical adjustment of the line support body.

Diagonal cross braces support the horizontal hot arms. The braces connect to the shaft of the line support body at a first end and to the horizontal line arms at the opposite. The cross braces can be released from the line support body and the arms lowered to a collapsed position. Preferably the horizonal arms also pin to the center of the T-shaped line support body, and are also unpinned along with the diagonal support arms to collapse the line arms. The arms each has a pivot to allow the arms to pivot to the collapsed position.

Preferably the T-shaped bracket has a top that has a series of slots. These slots are configured for engagement with a series of slats or rails at a connector end of each cross arm. A pivot point is positioned on each horizontal arm and extends downward so as to be pivotally connected at the end of each arm of the T-shaped connector.

BRIEF DESCRIPTION OF THE FIGURES

FIG. 2 is a front view of the line lifter of FIG. 1 having a center holder attached thereto.
FIG. 2a is a top view of the line lifter of FIG. 2.
FIG. 2b is a side view of the line lifter of FIG. 2.

DETAILED DESCRIPTION OF THE FIGURES

Figure 1:
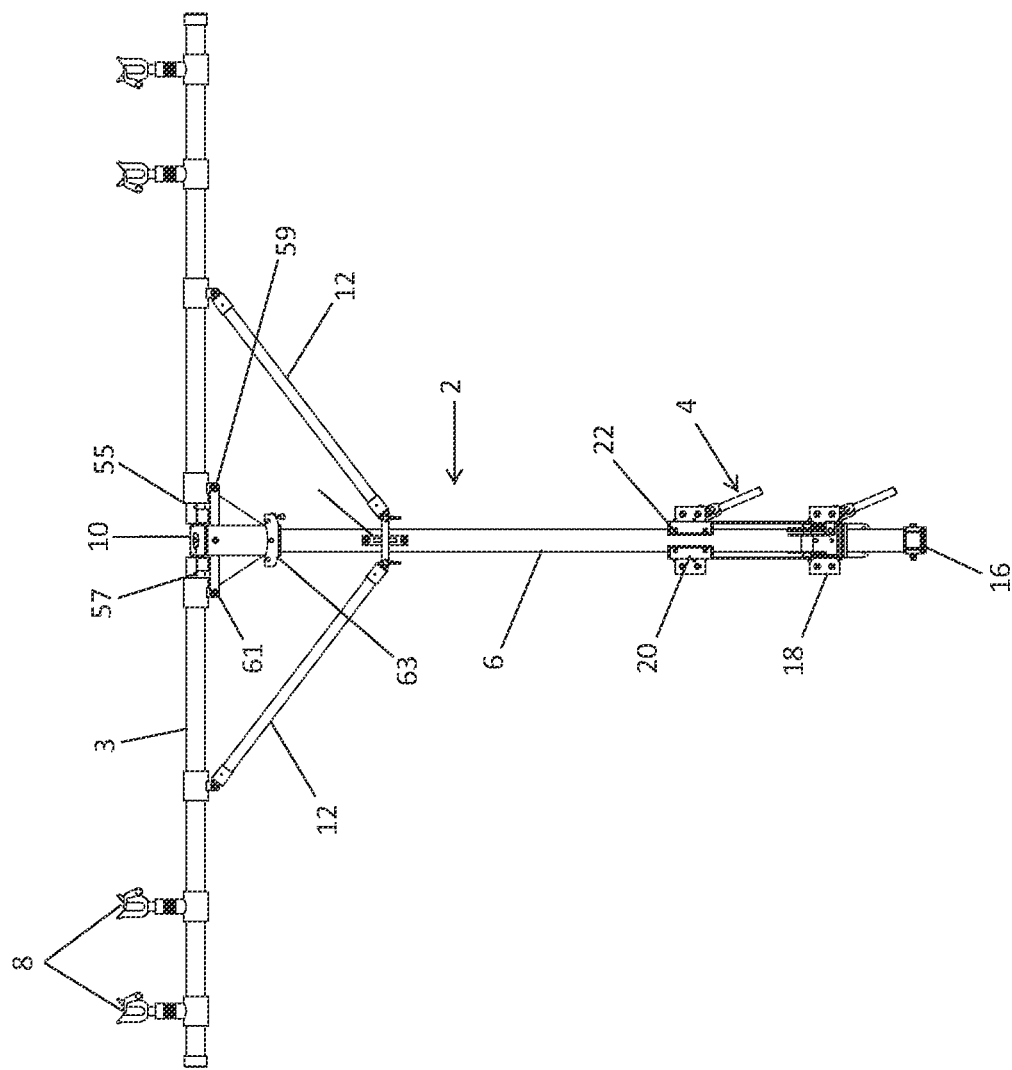
FIG. 1 is a front view of an embodiment of a line lifter.
Figure 5:
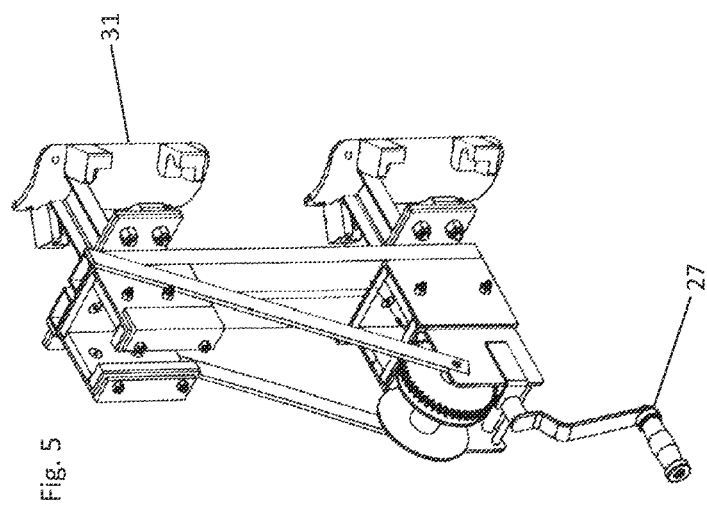
FIG. 5 is a perspective view of the embodiment of a lifting bracket of FIG. 4.

In the following description and in the figures, like elements are identified with like reference numerals. The use of "e.g.," "etc," and "or" indicates non-exclusive alternatives without limitation unless otherwise noted. The use of "including" means "including, but not limited to," unless otherwise noted.

FIGS. 1-2b illustrate an embodiment of the invention having a line support body 2 and a lifting bracket 4. The line support body having a T-shape having two opposing arms 3, 5 attached to a vertical shaft 6. The shaft is inserted into the lifting bracket 4 allowing for the vertical adjustment of the line support body in the lifting bracket by utilizing a lifting mechanism attached to the lifting bracket. The lifting mechanism causes the line support body to move vertically while the lifting bracket is retained in a stationary position. The lifting bracket has two spaced apart channels being upper channel 18 and lower channel 20 that provide support to the shaft of the body. A vertical adjustment mechanism is provided with the lifting bracket. The depicted vertical adjustment mechanism utilizes a cap 16 that is connected to a base of the shaft 6 of the body. The cap has a roller extending from the cap (illustrated for example at FIG. 7). Preferably the lifting mechanism utilizes a ratcheting adjuster, such as a hoist, that having a strap that extends through the roller of the cap. The hoist can be lever activated, power activated, or mechanically activated, such as by a nut drive configured for actuation by a wrench or power driver.

The upper channel in a preferred embodiment has a split in its outer circumference to allow for passage of connector 14 of the depicted embodiment of the line support body.

The depicted embodiments of the lifting brackets can be utilized with a variety of line support bodies. The line support body depicted herein is a collapsible line support body. The collapsible body utilizes tow arms 3, 5 that are connected at the center 10 of the line support body. The center 10 of the T-connector provides a slotted female connector (depicted in FIG. 10) that receives opposing slotted male ends 55, 57 of arms 3, 5. The ends of the arms and the center 10 preferably include through pin openings for insertion of one or more through pins to retain the ends of the arms in the extended position. Removal of the pins and detachment of diagonal support arms 12 from the diagonal support arm bracket 14 allows folding inward and downward of each line arm to a collapsed position (shown in FIG. 8). The line support body provides two opposing pivot connections 59, 61.

A removable holder 63 is shown and positioned for holding a center holder (28 of FIG. 2). The center holder allows a line worker can install a center wire holder in the vertical position that has a non-conductive shaft. Preferably the center holder is 1.5 inch to 4 inches in diameter for picking the center conductor on the power pole. Preferably the center holder utilizes a nonconductive round or square shaft can be from 2,3, or 4 ft in length. The vertical tube can pin to three different positions left, right or straight up inline with the shaft of the line support body. The three openings are illustrated in FIG. 1.

FIGS. 2, 2a, and 2b illustrate alternate views of the device of FIG. 1 having a center line holder 28 attached to the line support body. FIG. 2a illustrates a top view showing offset line arms extending away from the center 10. The ends of the line arms 114, 116 are positioned within slots of the center T-connector. In the depicted embodiment the slots extend upward from a center of the T, generally in line with the Alternatively the line arms can be aligned. A through pin extends through the slots of the center and the slots of the arms to secure the arms in position.

Two embodiments of lifting brackets are illustrated in FIGS. 3-5 and FIGS. 6-6a. The embodiment of FIGS. 3-5 utilizes a ratcheting strap 33 connected to a base 31. The depicted base has a rounded curvature for facilitating connection to a utility pole, which is typically a round pole. Two strap attachment pins are positioned into the base brackets (pin shown in FIG. 3, while brackets are shown without pin in FIG. 5). The strap is positioned around the utility pole and affixed to the base 31. The ratcheting strap is then tightened to secure the lifting bracket to the utility pole. The depicted lifting bracket utilizes two ratcheting straps and base connections connected to the lifting bracket at opposing ends of the lifting bracket and generally aligned with the channels that receive the shaft of the line support body.

Figure 4:
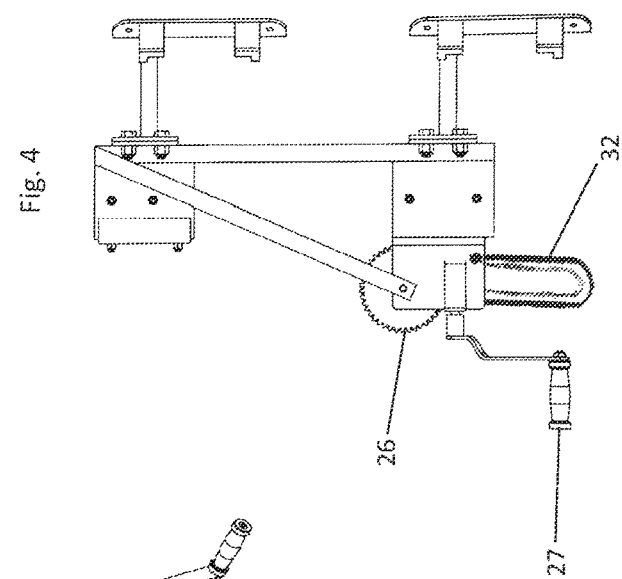
FIG. 4 is a side view of the embodiment of a lifting bracket of FIG. 4.
Figure 3:
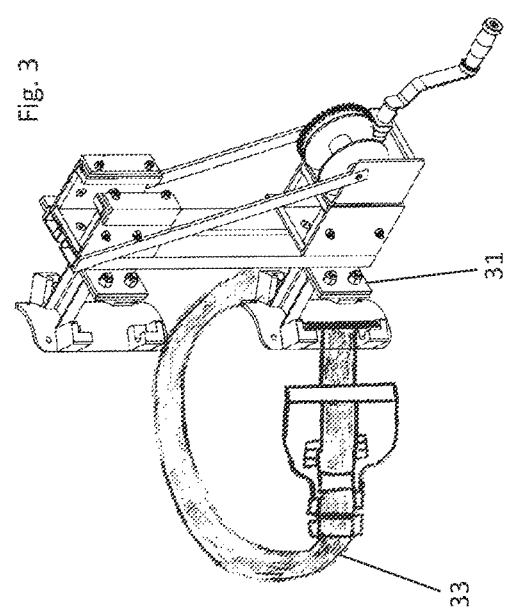
FIG. 3 is a perspective view of a lifting bracket including attachment configuration being a ratchet strap and base for attaching a line lifter to a pole.

FIG. 4 further illustrates the lifting mechanism for lifting the line support body. A handle is utilized to rotate the ratcheting spool 26 to increase and decrease the length of strap 36 that attaches to or travels through a cap and roller attached to the base of the shaft of the line support body. While a handle is shown, as discussed above a variety of actuation mechanisms can be utilized.

Figure 6A:
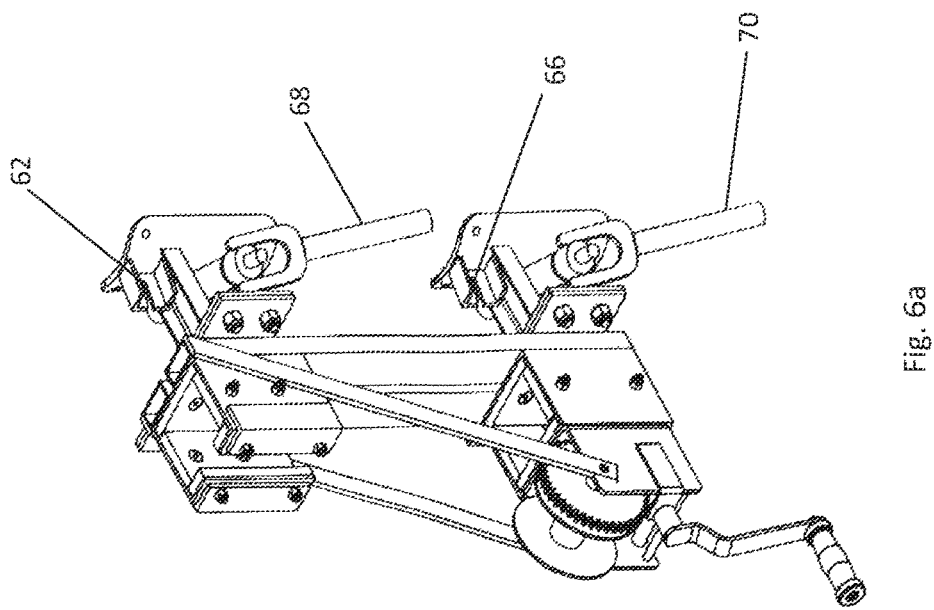
FIG. 6a is a second perspective view of the lifting bracket of FIG. 6 with the chain removed.
Figure 6:
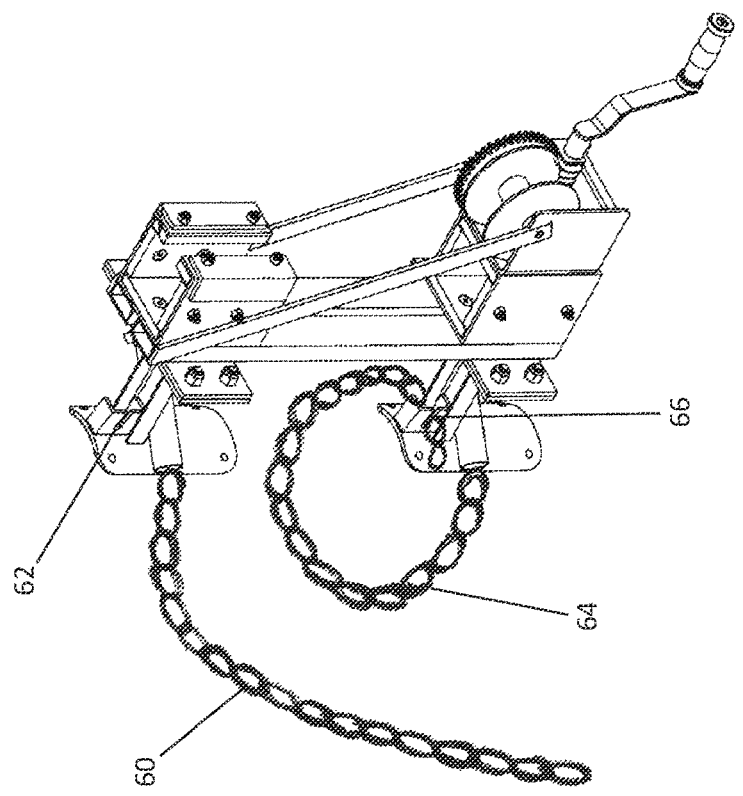
FIG. 6 is a front perspective view of a lifting bracket utilizing a chain and tensioner for connecting the lifting bracket to a pole.

FIGS. 6 and 6a illustrate an alternate attachment mechanism for mounting the lifting bracket to a utility pole. A chain 60 is attached at one end to the lifting bracket. The second end of the chain is positionable around the utility pole and connected at a slot 66 in or proximate to the base. A chain tensioner 70 increases tension in the chain to secure the chain and lifting bracket to the utility pole.

Figure 7:
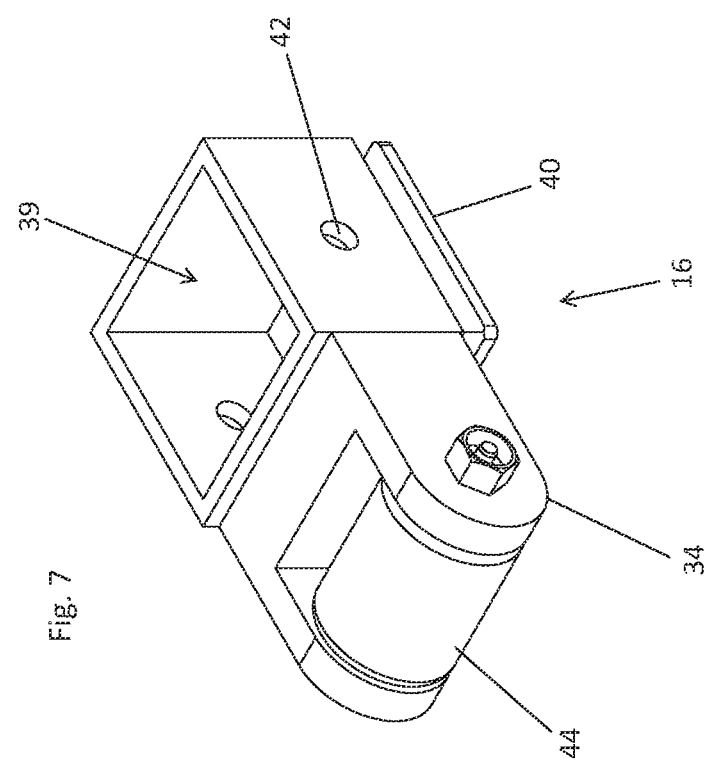
FIG. 7 is cap for connecting a line lifter pole to a lifting bracket lifting mechanism.

FIG. 7 illustrates a preferred embodiment of a cap 16 for attaching to the line support body. The cap defines a female receiver 39 for receiving an end of the shaft of the line support body. The receiver has a closed base 40. A roller bracket 36 extends from the body of the cap. A roller 44 is positioned in the cap. The strap 32 illustrated in FIG. 4 extends through the roller bracket. Extension and retraction of the strap causes the cap and associated line support body to move up and down (closer to and away from) the lifting bracket, causing vertical adjustment in the line support body that is secured in the lifting bracket.

Figure 9:
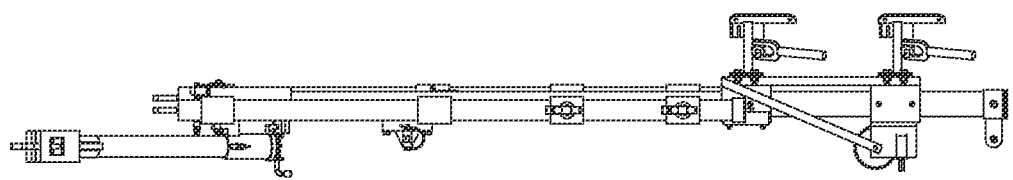
FIG. 9 is a side view of the line lifter having cross arms in a folded orientation of FIG. 8.
Figure 8:
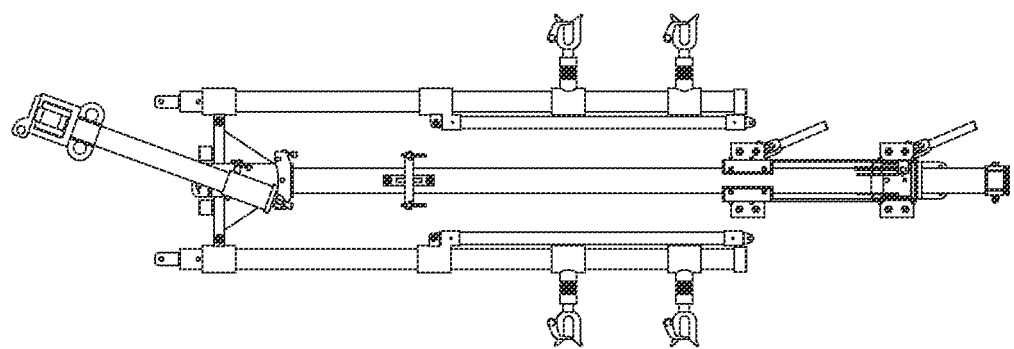
FIG. 8 is a front view of a line lifter having cross arms in a folded orientation.

FIGS. 8 and 9 illustrate the embodiment line support body in a collapsed position. The diagonal support arms have been detached from the bracket and the pins have been removed from the ends of the line arms, allowing the line arms to rotate on pivot points such that the outer end of each linear has rotated toward the lifting bracket.

Figure 10A:
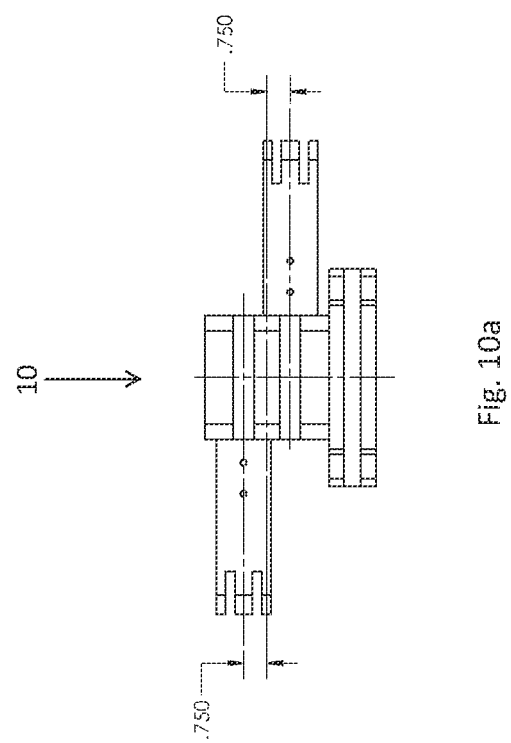
FIG. 10a is a top view of the embodiment of a line support bracket of FIG. 10.
Figure 10:
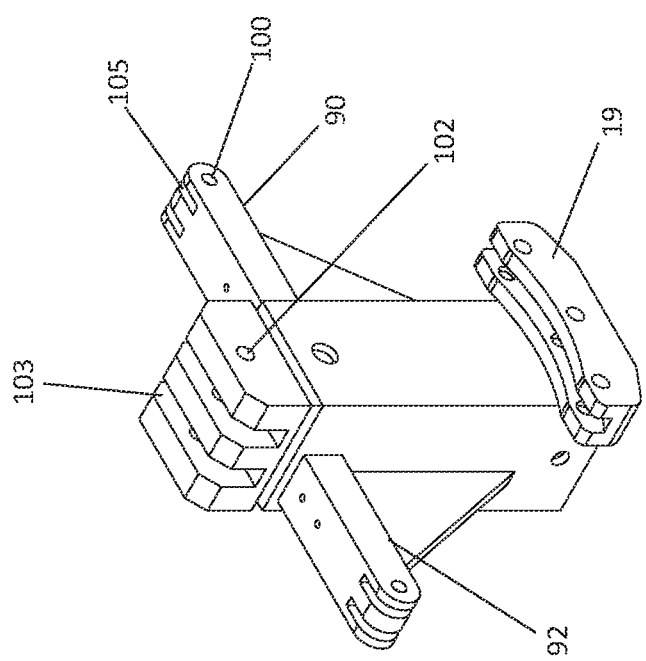
FIG. 10 is a perspective view of an embodiment of a line support bracket.
Figure 12:
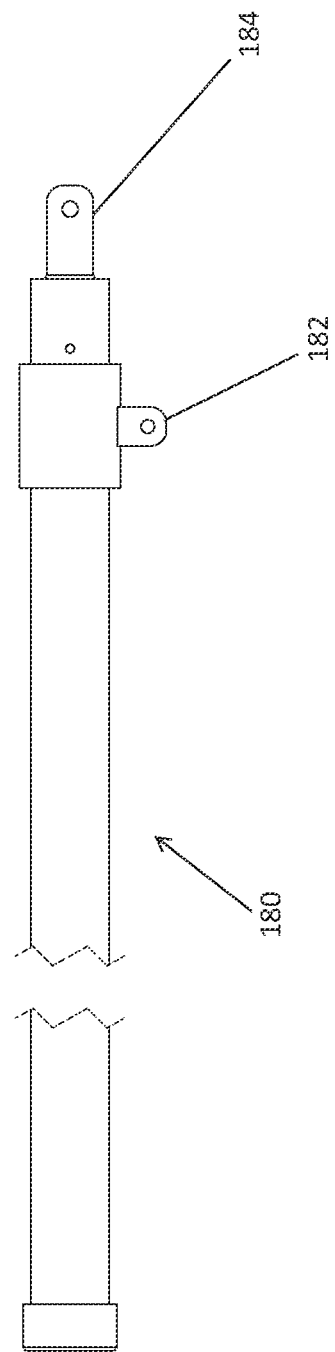
FIG. 12 is a view of one of an arm of the line lifter.

FIGS. 10 and 10a illustrate a perspective view and top view, respectively, the center 10 of the line support bracket. FIG. 10 provides a detailed view of the slots 103 and through hole 102 for securing the ends (184 of FIG. 12) of the line arm 180 to the center. The pivot ends 105 adjoin to a side mount on the line arms (illustrated as 182 in FIG. 12). The offset arms 90, 92 of the T-connector allow for offset mounting of the line arms in the slots 103 of the center mount.

Figure 11A:
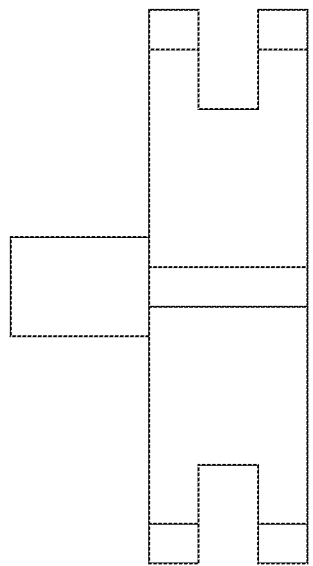
FIG. 11a is a top view of the embodiment of the diagonal support arm of FIG. 11.
Figure 11:
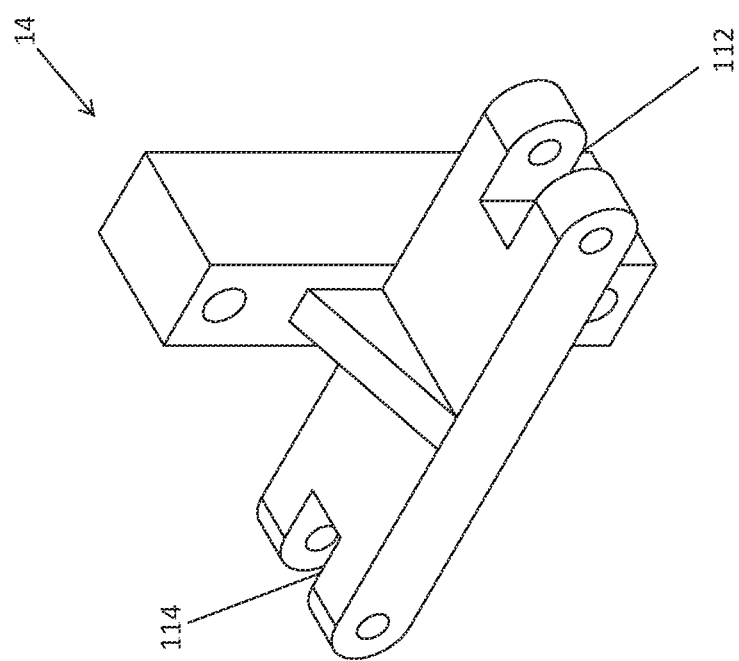
FIG. 11 is an embodiment of a diagonal support arm bracket for connecting the diagonal support arm to the line support body.

FIGS. 11 and 11a illustrate the diagonal support arm bracket 14 for connecting the diagonal support arm to the line support body in an extended position. The ends of each diagonal support arm are attached to the ends 112, 114 of the diagonal support arm bracket. The split or vertical channel in the upper channel of the lifting bracket is configured such that the bracket 14 can travel in the slot and pass through the upper channel to allow for maximum vertical travel of the line support body in the lifting bracket.

Still other features and advantages of the presently disclosed and claimed inventive concept(s) will become readily apparent to those skilled in this art from the following detailed description describing preferred embodiments of the inventive concept(s), simply by way of illustration of the best mode contemplated by carrying out the inventive concept(s). As will be realized, the inventive concept(s) is capable of modification in various obvious respects all without departing from the inventive concept(s). Accordingly, the drawings and description of the preferred embodiments are to be regarded as illustrative in nature, and not as restrictive in nature.

While certain exemplary embodiments are shown in the Figures and described in this disclosure, it is to be distinctly understood that the presently disclosed inventive concept(s) is not limited thereto but may be variously embodied to practice within the scope of this disclosure. From the foregoing description, it will be apparent that various changes may be made without departing from the spirit and scope of the disclosure as defined herein.

The invention claimed is:

1. A portable cross arm structure comprising:
   a support pole, said support pole comprising a shaft having a first end and a second end, said first end connected to a T connector, wherein said T connector is configured to attachment to two opposing line arms configured for attachment thereto of a series of electrical conductors on a top side of said opposing arms so as to support a series of electrical conductors above said opposing line arms, said opposing line arms are configured for retention in a horizontal position, wherein said T-connector and said opposing line arms are configured for folding of said opposing line arms to a position generally parallel to said support pole;
   a lifting bracket, said lifting bracket configured for connection to a vertical power pole, said lifting bracket defining a channel for vertical travel therein of said support pole, said lifting bracket comprising a worm gear hoist, wherein said worm gear hoist comprises a reel and a strap, said worm gear hoist configured to reel and unreel said strap on said reel;
   wherein said second end of said support pole comprising a roller, wherein said strap is configured to travel around said roller, wherein reeling and unreeling said strap on said reel causes said support pole to vertically travel up and down.

2. The portable cross arm structure of claim 1 wherein said support pole comprises a round cross section.

3. The portable cross arm structure of claim 1 wherein said support pole comprises a square cross section.

4. The portable cross arm structure of claim 1 wherein said lifting bracket comprises two spaced apart subbrackets defining said channel through said each of said lifting brackets.

5. The portable cross arm structure of claim 1 wherein said worm gear hoist is configured for operation by a power drill.

6. The portable cross arm structure of claim 1, wherein said lifting bracket is configured for mounting to a power pole by a strap and/or chain.

7. The portable cross arm structure of claim 1, wherein said roller is positioned on a cap, wherein said cap is removably attached to said second end of said support pole.

8. The portable cross arm structure of claim 1, wherein said portable cross arm structure comprises two diagonal support poles extending from a diagonal support pole bracket positioned at a point between said support pole first end and said support pole second end to a point on each of said line arms between said line arm center T connection and a distal end of each of said line arms, wherein said diagonal support poles are configured for removable attachment to at least one of said support pole and said line arms.

9. The portable cross arm structure of claim 8, wherein said lifting brackets comprise a slot configured for vertical travel of said diagonal support pole bracket during vertical travel of said support pole.

10. The portable cross arm structure of claim 1, wherein said T-connector comprises a top having a series of grooves configured for engagement with a series of projections on a line arm center T connection of each of said line arms, wherein said opposing line arms each comprises a through hole configured for engagement with a sliding pin, wherein said opposing line arms are staggered to be configured for passage therethrough of a single connection pin between both line arms.

11. The portable cross arm of claim 1 further comprising an arcuate center line holder bracket attached to said support pole, said arcuate center line holder comprising a channel on a top side of said arcuate center line holder on an inner circumference of said arcuate center line holder, said arcuate center line holder comprising a series of pin holes configured for engagement with a retaining pin at each of said pin holes;
a center line holder, said center line holder comprising a center line pole body having a center line holder first end and a center line holder second end, wherein said first end is configured for engaging a power conductor positioned at a center of the power pole, said second end configured with a flange configured for positioning within said channel of said arcuate center line holder.

12. The portable cross arm structure of claim 11, wherein said portable cross arm structure comprises two diagonal support poles extending from a point between said support pole first end and said support pole second end to a point on each of said line arms between said line arm center T connection and a distal end of each of said line arms, wherein said diagonal support poles are configured for removable attachment to at least one of said support pole and said line arms.

13. The portable cross arm structure of claim 1 wherein said top of said T connector is configured for removable engagement with said T connector of said cross arms, wherein said T connector defines two arms, wherein each of said line arms is configured for pivotal engagement with said arms of said T connector to collapse said portable cross arm structure.

14. The portable cross arm structure of claim 1 wherein said lifting bracket is configured for connection to the power pole by a strap and/or chain.

15. A portable cross arm structure comprising:
a support pole, said support pole comprising a shaft having a first end and a second end, said first end connected to a T connector, wherein said T connector is configured to attachment to two opposing arms configured for attachment thereto of a series of electrical conductors;
a lifting bracket, said lifting bracket configured for connection to a vertical power pole, said lifting bracket defining a channel for vertical travel therein of said support pole;
wherein said second end of said support pole comprising a roller and a strap, wherein said strap is configured to travel around said roller, wherein reeling and unreeling said strap on said reel causes said support pole to vertically travel up and down;
an arcuate center line holder bracket attached to said support pole, said arcuate center line holder comprising a channel on a top side of said arcuate center line holder on an inner circumference of said arcuate center line holder, said arcuate center line holder comprising a series of pin holes configured for engagement with a retaining pin at each of said pin holes;
a center line holder, said center line holder comprising a center line pole body having a center line holder first end and a center line holder second end, wherein said first end is configured for engaging a power conductor positioned at a center of the power pole, said second end configured with a flange configured for positioning within said channel of said arcuate center line holder.

16. The portable cross arm structure of claim 9, wherein said portable cross arm structure comprises two diagonal support poles extending from a point between said support pole first end and said support pole second end to a point on each of said line arms between said line arm center T connection and a distal end of each of said line arms, wherein said diagonal support poles are configured for removable attachment to at least one of said support pole and said line arms.

* * * * *